United States Patent [19]

Belliot et al.

[11] 3,925,535

[45] Dec. 9, 1975

[54] CATALYTIC PRODUCT FOR THE OXIDATIVE DESTRUCTION OF GASEOUS ORGANIC COMPOUNDS AND METHOD FOR THEIR PREPARATION

[75] Inventors: Christian Belliot; Etienne Cheylan; Serge Madelaine; Johannes Ebbing, all of Paris, France

[73] Assignee: Compagnie Francaise Thomson Houston-Hotchkiss Brandt, Paris, France

[22] Filed: Mar. 12, 1974

[21] Appl. No.: 450,348

Related U.S. Application Data

[63] Continuation of Ser. No. 203,833, Dec. 1, 1971, abandoned.

[30] Foreign Application Priority Data

Dec. 1, 1970   France .......................... 70.43189

[52] U.S. Cl. ............. 423/213.2; 252/471; 423/245; 423/247
[51] Int. Cl.² ...................... B01J 8/00; B01J 10/00
[58] Field of Search ............... 423/213.2, 245, 247; 252/471, 455 R

[56] References Cited

UNITED STATES PATENTS

| 3,150,922 | 9/1964 | Ashley ............................. 423/213.2 |
| 3,663,457 | 5/1972 | Tamura ............................ 252/471 X |

FOREIGN PATENTS OR APPLICATIONS

| 1,101,160 | 3/1961 | Germany .......................... 423/247 |

*Primary Examiner*—L. Dewayne Rutledge
*Assistant Examiner*—Arthur J. Steiner
*Attorney, Agent, or Firm*—Edwin E. Greigg

[57] ABSTRACT

A method for the oxidative destruction of gaseous organic compounds consists essentially of passing the organic compounds and an excess of air at a temperature from about 180° C to about 800° C over a catalyst consisting essentially of from about 50 to about 85% by weight of manganese oxides, primarily in the form of rhombohedral manganese dioxide; up to about 30% by weight of manganese carbonate; from about 3% to about 10% by weight of cupric oxide; and up to about 15% by weight of nickel oxides in a refractory excipient. Organic compounds destroyed include xylenols, pyridine, methylpyrrolidone, thiophene, and the like.

13 Claims, No Drawings

CATALYTIC PRODUCT FOR THE OXIDATIVE DESTRUCTION OF GASEOUS ORGANIC COMPOUNDS AND METHOD FOR THEIR PREPARATION

Reference To Related Applications

This is a continuation in part of our application Ser. No. 203,833, filed Dec. 1, 1971 and now abandoned. Reference is also made to Ser. No. 380,721, filed July 19, 1973, which is a divisional application of Ser. No. 203,833.

This invention relates to improvements in catalytic products capable of guaranteeing destruction, by oxidation, of harmful or malodorous gases and vapors or organic origin, as well as their preparation method and their uses. By way of particularly advantageous uses, one might mention the destruction of vapors of toxic solvents coming from varnishing or enameling installations, plastic treatment installations, installations for the pyrogenation (burning) of household and similar garbage, as well as engine exhaust gases.

Known catalytic products for the destruction of gases and vapors of organic origin frequently have a precious metal base; consequently, they are expensive and they are sensitive to contamination by various impurities.

In the art of the destruction of gaseous carbon-containing compounds, especially organic compounds, by oxidation over a catalyst, a persistent difficulty is the lack of availability of catalysts which are stable at temperatures customarily used in aforesaid oxidative destruction of organic compounds, such as the xylenols, cresols, pyridine, methyl isobutyl ketone, methylpyrrolidone, thiophene, butyl acetate, ethylene glycol ethers and acetates and hydrocarbons, e.g., toluene, heptane, 2,2,4-trimethylpentane, as well as at lower temperatures commonly used for the oxidation of inorganic carbon-containing compounds, e.g., carbon monoxide.

Frazer et al, in U.S. Pat. No. 1,345,323, teaches the preparation of a manganese-based oxidation catalyst, wherein the catalyst is an extremely-finely divided or semicolloidal condition and wherein the catalyst compounds must be dried carefully at temperatures below 200° C to preclude loss of catalytic activity. The resulting catalyst is usable at ordinary or slightly elevated temperatures, such as in the range from 100° to 200° C.

Hoekstra, in U.S. Pat. No. 3,133,029, suggests the preparation of a plurality of catalysts on an alumina support by precipitation of a metallic, apparently amorphous, carbonate or hydrous oxide in the presence of excess ammonia. The catalyst is first dried at a temperature below about 400° F and then calcined at a high temperature, such as 1000° C, to provide a composite with the base material.

Stephens et al, in U.S. Pat. No. 3,433,581, teach the preparation of a complex laminar catalyst structure consisting of an alumina core covered with a transitional or lanthanide metal and then cupric oxide. The catalyst is useful for the removal of carbon monoxide and hydrocarbons from exhaust gases.

Ashley, in U.S. Pat. No. 3,150,922, teaches the preparation of a catalyst for the oxidation of hydrocarbon gases in exhaust gas by impregnating granular alumina with manganese and copper oxides.

Kato et al, in U.S. Pat. No. 3,436,356, and Cho et al, in U.S. Pat. No. 3,498,928, teach the preparation of a catalyst of pure manganese oxide on an activated zeolite by impreganting the zeolite with manganous sulfate or manganous chloride and a second salt, such as a copper salt, and calcining the material at 600°–700° C. It will be apparent that none of the foregoing references teaches that a catalyst usable for the oxidative destruction of both carbon monoxide and gaseous organic compounds has as a major component stable, porous, catalytically active rhombohedral manganese dioxide, obtained by the calcinaation of manganous carbonate at a temperature around 300° C. It will also be apparent that the references cited generally rely on the use of a specially-activated substrate as the catalyst support, rather than on a cement or clay-based refractory matrix.

It has been found, in accordance with this invention, that catalysts consisting essentially of from about 50 to about 80% by weight of active ingredients consisting of from about 50 to about 85% by weight of manganese oxides, substantially in the rhombohedral form; up to about 30% by weight of manganous carbonate; from about 3 to about 10% by weight of cupric oxide and up to about 15% by weight of nickel oxides and from about 50 to about 20% by weight of cold-shapable refractory excipient are useful both for the oxidation of gaseous organic materials at temperatures from about 180° C to about 800° C and for the oxidation of carbon monoxide at any temperature above about −40° C.

The catalytic products of this invention are economical and have good mechanical strength. These products made by the method of the invention, starting with the improved catalytic compounds resulting from one particular combination of certain metal oxides and excipient, make it possible efficiently to employ the property of these oxides to catalyze the oxidation of a large number of organic compounds which generally are responsible for the odor and toxicity of the residual vapors of many industrial establishments and which resist all economical treatments known until now.

According to the invention, these catalytic compounds include:

50–85% manganese oxides, primarily rhombohedral
0–30% manganous carbonate
3–10% cupric oxide
0–15% nickel oxides The excipient added to these catalytic compositions is preferably a cement or a clay-base refractory product. The cement or clay-base refractory product represents 20–50% and preferably from about 25 to 35% of the total weight of the mixture obtained; according to the invention, it serves especially as a refractory binding agent, giving good mechanical strength to the components of this mixture in the conditioning process as for various forms of the final catalytic product. For example, the cement or clay-base refractory product makes it possible to cold-shape this mixture into any geometrical form desired or to keep this mixture on any desired support of metal or refractory material, which is presented in the form of a honeycomb block, plate, grid (grill), or sheet.

In the oxidative destruction of harmful or foulsmelling gases and vapors, of organic origin, at temperatures between about 180° C and 350° C, the preferred compositions for the active catalytic material of this invention are as follows:

manganese oxides, substantially rhombohedral 40–60%
manganous carbonate 20–30%
cupric oxide 5–10% nickel oxides 8–12%

Cement or clay-base refractory product (excipient).

These oxides, according to the invention, result from the open-air heating reaction, performed at a moderate temperature of the order of 300° C, that is, from heating of a mixture of corresponding metallic carbonates and hydroxycarbonates, that is, manganous carbonate, cupric hydroxycarbonate, and nickel hydroxycarbonate between about 275° and about 325° C. This moderate heating temperature consequently leaves intact a certain proportion of residual manganous carbonates and yields manganese dioxide of a particular physical shape, in the form of elementary grains on the order of a micron in a crystalline form retaining the structure of the rhombohedric form of the generating (precursor) manganous carbonate.

The optimum composition of the catalytic product according to this invention for the oxidative destruction of harmful or foul-smelling gases and odors of organic origin at temperatures above 300° C is as follows:

manganese oxides, substantially rhombohedral, 75–85% cupric oxide 5–10% nickel oxides 5–15%

A catalyst of this composition is obtained by heating a mixture of manganous carbonate, cupric hydroxycarbonate and nickel hydroxycarbonate first at about 300° for up to about 10 hours to convert a substantial amount of the manganous carbonate to the rhombohedral oxide and then rapidly to 600–1000° C to complete conversion of the carbonates and hydroxycarbonates to the oxides and to fuse the cold-shapable excipient to a strong, abrasion-resistant catalyst.

A preferred technique for making catalysts useful in the practice of this invention is to incorporate the carbonate and hydroxycarbonate mixture into the cement or clay excipient and to dry the mixture at room temperature for about 48 hours. Then, the mixture is dried at about 100° C for about 8 to 12 hours, and after the cement has set, calcined at about 300° C for about 8 to about 12 hours. As a result, about 60–75% of the manganous carbonate is converted to rhombohedral manganese dioxide. The remainder of the manganous carbonate is unchanged.

Another preferred technique for making catalysts useful in the practice of this invention is to dry the mixture of carbonates and hydroxycarbonates in the cement or clay excipient at room temperature for about 48 hours. Then the mixture is dried at 90°–100° C for about 8 to about 12 hours and calcined at about 300° C for at least two hours, but preferably for six to ten hours. Thereafter, the temperature is rapidly raised to about 900° C over not more than about an hour to convert residual manganous carbonate to $MnO_2$ and cooled rapidly to room temperature. The product thus obtained was analyzed for manganese oxide content by titration with oxalic acid and for crystallographic structure by x-ray analysis. The product obtained by this procedure is substantially, although not entirely, rhombohedral, as indicated by x-ray crystallography. Thus, the rhombohedral manganese dioxide structure persists during calcination at temperatures above about 300° C.

Unlike the teachings of the prior art, it has been found that catalysts useful in the practice of this invention can be obtained only when non-colloidal, crystalline manganous carbonate is used as a source of manganese oxides. The carbonate is preferably precipitated from solution using ammonium carbonate or bicarbonate, so as to avoid the formation of manganese hydroxides or other manganese compounds which give pyrolusite manganese oxides, which are quadratic in structure, upon calcination. The pyrolusite manganese oxides are catalytically inactive for the purposes of this invention.

Also, unlike the prior art, it will be appreciated that the catalysts of the present invention are not prepared by impregnation of a support with a soluble species, but from insoluble crystalline manganous carbonate, which could not be applied to a substrate in the conventional manner.

It will also be understood that cold-shapable refractory excipients useful for the purpose of this invention include clays, such as montmorillonite and kaolinite, and cements, such as siliceous and magnesia cements. Usually, siliceous and magnesia cements will be preferred for catalysts intended for lower temperature use, because these cements cure to high strength composites without the need for being heated above 300° generally used to prepare the rhombohedral manganese oxide catalytic species. When catalysts are intended for use at tamperatures above about 300° C, the clay materials are preferred because the catalyst preparation will ordinarily utilize heating in the 600°–1000° C rannge in order to complete the conversion of manganous carbonate to the oxides.

When the catalysts of the present invention are used in temperature ranges below about 500° C for the destruction of organic vapors, the catalysts preferably contain nickel oxide, preferably of the order of about 8 to about 12% by weight of active ingredients. Catalysts intended for use above 500° C, such as for burning the waste gases from enameling furnaces need not contain nickel.

In using the catalysts of the present invention to oxidize organic gases, the appropriate reaction temperature is maintained either by heating the gases being oxidized up to about 300° C and relying on the reaction heat to maintain the necessary temperature or by heating the catalyst bed at the selected temperature.

In practicing the method of this invention, the ratio of air or other oxygen-containing gas to organic vapors is in the range of 5:1 or higher so as to provide excess oxygen for regeneration of the catalytic species. Preferably, the ratio of air to organic is above 5:1, calculated on the basis of complete combustion to carbon dioxide.

It is thought that excess oxygen present in the air being passed over the catalyst is needed to regenerate lower manganese oxides, such as $Mn_2O_3$, which may be formed during the catalytic oxidation. It has been found that the catalysts of the present invention have a long life when used with the proper amount of air, so that it is reasonable to believe that the catalytic species is very stable or is readily regenerated.

In using the method of this invention, it must be appreciated that use of the catalysts above about 800° C for prdonged periods of time is not recommended, because manganese dioxide tends to decompose above this temperature to inactive manganese oxides, e.g., $Mn_3O_4$, which are not regenerated. Usually, the temperature is regulated by controlling the temperature of the catalyst bed or by controlling the rate of addition of the air and the organic compound being destroyed. Also, the temperature can be regulated by variations in the distribution of the catalyst in the reactor and in the shape of the catalyst particles.

By way of illustration, we give below some descriptive examples for preparing catalytic products according to the invention.

EXAMPLE 1

We mix saturated aqueous solutions of:
- $MnCl_2 . 4 H_2O$     949 g.
- $CuCl_2 . 2 H_2O$     41 g.
- $NiCl_2 . 6 H_2O$     194 g.

and we add the mixture to a saturated solution of $NH_4HCO_3$ (951 g.) or an excess of 5% ammonium bicarbonate. A mixture of hydroxycarbonates of manganese, of copper, and of nickel precipitates. To this we add 400 g. of cement or clay-base refractory product in order to make out of it a paste which will be more or less thick, depending upon the requirements of making the form which we have given to the final catalytic product. A paste, which flows easily, facilitates impregnating honeycomb supports or supports in the form of a sheet. Medium consistency makes it possible to deposit the paste on metallic or refractory supports that have the shape of a plate, grill, or rod and it is easier for the paste to stick to these supports. A thick paste makes it possible — by means of molding or extrusion — to make any desired geometrical shape, such as a disc, a tube, a briquette, a granule, a little stick, or a ring. After the cement has set or after the clayey refractory product has dried the mixture thus shaped, with or without support, is subjected to heating in an oven or ventilated kiln; it is heated to 300+ C in order in situ to perform in a progressive manner, reactions of the following type which transform the carbonates, supported by the refractory binding agent, into oxides:

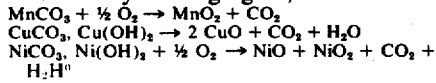

This open-air heating operation:
$MnCO_3 + \frac{1}{2} O_2 \rightarrow MnO_2 + CO_2$ stops at about 60% with respect to the manganese used. The catalytic product thus obtained contains about
- 55% manganese oxides
- 30% manganous carbonate
- 5% cupric oxide
- 10% nickel oxides kept firmly in place by the cement or the clay-base refractory product. The catalytic product, which retains intact the shape which it received prior to heating, now has a very porous structure, created during the heating by expulsion of carbon dioxide, and is now ready to be replaced in a stream of gas or vapors of organic origin which must be destroyed, in order to catalyze their oxidation.

EXAMPLE 2

A mixture of hydroxycarbonates of manganese, copper, and nickel is obtained in the same manner as described in Example 1.

This mixture is dried and placed in a ventilated stove and it is heated to 300° C in order to perform the reactions of the type mentioned in Example 1 which transform the carbonates into oxides. Open-air heating:

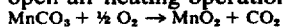

reaches a top at about 60% with respect to the manganese used.

The catalytic compounds thus obtained include:
- 55% manganese oxides,
- 30% manganous carbonate,
- 5% cupric oxide,
- 10% nickel oxides.

These catalytic compounds are mixed with cement or clayey refractory product whose weight represents about 30% of the total weight of the mixture, in order, as in Example 1, to make up a paste which will be more or less thick, according to the requirements of making the desired shape of the final catalytic product. After the cement has set or after the clayey refractory product has dried, the catalytic product obtained has good mechanical strength and is ready for use in the oxidative destruction of harmful or foul-smelling gases and vapors of organic origin.

We found, rather surprisingly, that starting at about 180° C, it is possible by passing (gaseous organic compounds) over catalytic products obtained in accordance with Examples 1 and 2 to accomplish the total combustion of gaseous organic compounds, e.g., the residues of engine gases and furnace gases from varnishes and solvents, which were either completely resistant to any destructive treatment or which were sensitive only to catalysts based on a precious metal.

Examination of the catalytic product of Examples 1 and 2 microscopically and by x-rays indicates that the manganese dioxide obtained in the form of grains on the order of a micron retains the spectrum of rhdocrosite (natural manganese carbonate) which has a rhombohedric crystalline structure. This particular structure of manganese dioxide and the great porosity of the catalytic product made enables us to obtain exceptional catalytic activity of this product at low temperatures. Temperatures for the transformation of the carbon monoxide into $CO_2$ can be as low as $-40°$ C.

EXAMPLE 3

A mixture of hydroxycarbonates of manganese, of copper, and of nickel is obtained in the same fashion as described in Example 1. This mixture is subjected to forceful desiccation and it then heated progressively in contact with air at a temperature of about 650° C, until we get a content of about 55% total dioxides (expressed as $MnO_2$) determined by titration with oxalic acid.

After heating, the carbonates and hydroxycarbonates are totally transformed into oxides. The mixture obtained includes about:
- 85% manganese oxide,
- 5% copper oxide,
- 10% nickel oxides.

Cement or clay-base refractory product is added to these oxides in order, as in Example 1, to make a paste which will be more or less thick, depending upon the requirements of making the shape we want to give to the final catalytic product. The weight of the cement or the clayey refractory product used represents 20–50%, or preferably 30% of the total weight of the oxides-cement mixture. After the cement sets or after the clayey refractory product is dry, the catalytic product obtained has good mechanical strength, regardless of the form which we give it. This catalytic product is ready for use in the oxidative destruction of harmful or foul-smelling gases and vapors of organic origin, preferably at a temperature above 300° C.

The catalytic products of the invention described above make it possible, in an economical fashion, to accomplish the oxidative destruction of toxic and foul-smelling industrial organic products such as cyclic and heterocyclic products, e.g., pyridine and its homologues, methylpyrrolidone, the sulfurated heterocycles present as permanent impurities in solvents, e.g., the cresols, the xylenols, methylisobutylketone, butyl acetate, ethylene glycol acetates, etc.

We can establish the effectiveness of this destruction by at least three means. The first consists of the disappearance of the odor of the vapors treated. This means is extremely effective because the compounds involved, as is known, have an intolerable odor, even with a content of just a few ppm per cubic meter. Disappearance of any perceptible odor is thus proof of the destruction of these compounds down to the very smallest traces.

The second means consists in a quantitative evaluation of the possible residues of compounds involved here using a Draeger tube. By this means, we exercise visual assay of the effectiveness of the reaction by colored reagents.

Finally, the third means consists of gas-phase chromatography of the gas to be treated, before and after passage over the catalyst.

Results from these three means agree with each other. For example, gas having a content of 6 g./m.$^3$ of xylenol (the usual content of gases in kilns used to enamel-coat electrical wires), obtained by bubbling air in xylenol at ambient temperature, and subjected to catalytic oxidation treatment over a catalyst made according to Examples 1 and 2, but without any nickel, is freed of xylenol starting at 220° C; with the same cataylst, but containing nickel, this temperature is lowered to 180° C.

Similar tests made at levels of pyridine and methylpyrrolidone of the same order, gave entirely similar results.

The mixture perfected, according to the invention, of catalytic compounds and excipient, such as cement or a clay-base refractory product, enables us to obtain catalytic compounds giving excellent flexibility in terms of their being shaped into a final catalytic product offering great mechanical strength. Good mechanical strength prevents premature breakup of the catalytic product and, by virtue of this fact, prolongs its lifetime and its effectiveness. The wide variety of forms which can be given to the catalytic product in the invention and its mechanical strength, enables us substantially to enlarge the possibilities of designing installations involving the oxidative destruction of harmful and foul-smelling gases and vapors.

EXAMPLE 4

The catalyst is prepared consisting of about 70% by weight of catalyst components (60% of rhombohedral manganese dioxide, 25% of manganous carbonate, 7% of cupric oxide and 8% of nickel oxides) and 30% of magnesia cement prepared by calcination at about 290° C for about 12 hours.

The catalyst is used at about 220° C, with about a six-fold excess of air, to destroy pyridine vapors.

EXAMPLE 5

A catalyst is prepared consisting of about 60% by weight of active components (75% of substantially rhombohedral manganese dioxide, 10% of cupric oxide and 15% of nickel oxides) and 40% by weight of montmorillonite clay as excipient. The catalyst is prepared by being heated at about 310° C for about 10 hours and then to about 900° C during one hour.

The catalyst is used at about 600° C for the destruction of methyl pyrrolidone in the presence of a tenfold excess of air.

EXAMPLE 6

A catalyst is prepared according to Example 5, except that kaolinite clay is used as excipient. The catalyst is used at 750 C, with an eight-fold excess of air, for the destruction of methyl isobutyl ketone.

EXAMPLE 7

A catalyst is prepared according to Example 4, except that a siliceous cement is used as excipient. The catalyst is used at about 325° C, with a five-fold excess of air, for the destruction of a xylenol mixture.

EXAMPLE 8

The catalyst of Example 6 is used at about 35° C to convert CO to $CO_2$ in the presence of a five-fold excess of air.

EXAMPLE 9

The catalyst of Example 4 is used, in the presence of a seven-fold excess of air, at 100° C to convert CO to the dioxide.

EXAMPLE 10

Catalyst prepared according to Example 5 is used at about 450° C in the presence of about a six-fold excess of air to oxidize exhaust gases from each of the following: a varnishing installation, such as in an automobile plant; from a plastics treating installation, wherein substantial amounts of ketonic and acetate materials are present in the exhaust gases; from the burning of household garbage; from an internal combustion engine, wherein the exhaust gases contain large amounts of hydrocarbons, such as 2,2,4-trimethylpentane; and from an enameling kiln.

EXAMPLE 11

In like manner, catalyst prepared according to Example 6 is used at about 400° C to oxidize gases emanating from the sources indicated in Example 10.

That which is claimed is:

1. A method for the oxidative destruction of gaseous organic compounds consisting of passing gaseous organic compounds and at least a five-fold excess of air at a temperature from about 180° to about 800° C over a catalyst consisting essentially of from about 50 to about 80% by weight of catalyst components consisting of from about 50 to about 85% by weight of manganese oxides, substantially in the rhombohedral form; up to about 30% by weight of manganous carbonate; from about 3 to about 10% by weight of cupric oxide and up to about 15% by weight of nickel oxides and from about 50 to about 20% by weight of cold-shapable refractory excipient.

2. The method of claim 1, wherein the temperature at which gaseous organic catalyst compounds are passed over the catalyst is in excess of 300° C.

3. The method of claim 1, wherein the active catalyst components consist of from about 75 to about 85% of manganese oxides, substantially in the rhombohedral form; from about 5 to about 10% by weight of cupric oxide and from about 5 to about 15% by weight of nickel oxides and wherein the temperature at which gaseous organic compounds are passed over the catalyst is between about 300° and about 500° C.

4. The method of claim 1, wherein the gaseous organic compounds are selected from the group consisting of xylenols, cresols, pyridine, methyl isobutyl ketone, methyl pyrrolidone, thiophene, butyl acetate, ethylene glycol ethers and acetates, and hydrocarbons.

5. The method of claim 1, wherein the cold-shapable refractory excipient is selected from the group consisting of magnesia and siliceous cements and kaolinite and montmorillonite clays.

6. The method of claim 1, wherein the catalyst consists of from about 65 to about 75% by weight of catalyst components and from about 35 to about 25% by weight of cold-shapable refractory excipient.

7. The method of claim 1, wherein catalyst components consist of from about 40 to about 60% of substantially rhombohedral manganese oxides, from about 20 to about 30% by weight of manganous carbonate, from about 8 to about 12% by weight of nickel oxides and from about 5 to about 10% by weight of cupric oxide and wherein the temperature at which gaseous organic compounds are passed over the catalyst is between about 180° C and about 350° C.

8. The method of claim 1, wherein gaseous organic compounds are exhaust gases from varnishing installations.

9. The method of claim 1, wherein gaseous organic compounds are exhaust gases from plastic-treating installations.

10. The method of claim 1, wherein gaseous organic compounds are exhaust gases from the burning of household garbage.

11. The method of claim 1, wherein gaseous organic compounds are exhaust gases from internal combustion engines.

12. The method of claim 1, wherein gaseous organic compounds are exhaust gases from enameling kilns.

13. A method for the oxidative destruction of carbon monoxide consisting of passing a gas stream containing carbon monoxide and at least a five-fold excess of air at a temperature above about −40° C over a catalyst consisting essentially of from about 50 to about 80% by weight of catalyst components consisting of from about 50 to about 85% by weight of manganese oxides, substantially in the rhombohedral form; up to about 30% by weight of manganese oxides, substantially in the rhombohedral form; up to about 30% by weight of manganous carbonate; from about 3 to about 10% by weight of cupric oxide and up to about 15% by weight of nickel oxides and from about 50 to about 20% by weight of cold-shapable refractory excipient.

* * * * *